(12) United States Patent
Souchkov

(10) Patent No.: US 8,450,673 B2
(45) Date of Patent: May 28, 2013

(54) PIXEL CIRCUIT, IMAGING INTEGRATED CIRCUIT, AND METHOD FOR IMAGE INFORMATION ACQUISITION

(75) Inventor: Vitali Souchkov, Walnut Creek, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 386 days.

(21) Appl. No.: 12/916,044

(22) Filed: Oct. 29, 2010

(65) Prior Publication Data

US 2012/0104228 A1 May 3, 2012

(51) Int. Cl.
*H01L 27/00* (2006.01)
(52) U.S. Cl.
USPC ............... 250/208.1; 250/214.1; 250/214 A; 348/294; 348/300
(58) Field of Classification Search
USPC ......... 250/208.1, 214.1, 214 R, 216, 214 DC, 250/214 A; 348/294, 297, 300, 301, 302
See application file for complete search history.

(56) References Cited

U.S. PATENT DOCUMENTS

| | | | |
|---|---|---|---|
| 7,220,959 B2 * | 5/2007 | Nishimura | ............... 250/226 |
| 7,544,921 B2 | 6/2009 | Boemler | |
| 2003/0183850 A1 | 10/2003 | Pain et al. | |
| 2009/0225211 A1 | 9/2009 | Oike | |
| 2009/0237536 A1 | 9/2009 | Purcell et al. | |
| 2009/0321799 A1 * | 12/2009 | Velichko et al. | ............... 257/292 |
| 2011/0006191 A1 * | 1/2011 | Watanabe et al. | .......... 250/208.1 |

OTHER PUBLICATIONS

V. Suntharalingam, G. Prigozhin, R. D'Onofrio, S. Kissel, M. Bautz; "Back-Illuminated, Three-Dimensionally Integrated CMOS Imager with In-Pixel CDS"; Kavli Institute for Astrophysics and Space Research, Massachusetts Institute of Technology; p. 155-157; Lexington, MA.

* cited by examiner

*Primary Examiner* — Francis M Legasse, Jr.

(57) ABSTRACT

A pixel circuit uses two storage transistors to store two image signal samples, which include a reference signal produced by background noise of the pixel circuit and a signal produced by optical exposure of a photodetector and the background noise of the pixel circuit. An imaging integrated circuit uses a pixel circuit array, which may contain a number of such pixel circuits, and a charge acquisition circuit configured to read out image information obtained by the pixel circuit array. The charge acquisition circuit uses a first amplifier and a serially connected differential integrator that includes a second amplifier, a first differential integrator section and a second differential integrator section for the read out. A method for image information acquisition involves obtaining image information using the pixel circuit array and reading out the image information obtained by the pixel circuit array using the charge acquisition circuit.

12 Claims, 7 Drawing Sheets

PIXEL CIRCUIT, IMAGING INTEGRATED CIRCUIT, AND METHOD FOR IMAGE INFORMATION ACQUISITION

BACKGROUND

An imaging integrated circuit (IC) uses a pixel circuit array to collect image information from a target scene. For example, an imaging pixel circuit array in an optical mouse can collect image information for motion estimation from a surface on which the optical mouse is manipulated. The pixel circuit array includes a number of pixel circuits, in which each pixel circuit collects a separate image signal sample. The image signal samples that are collected by the pixel circuits have to be transferred from individual pixel circuits to a back-end signal processor for processing.

The process of collecting image signal samples using pixel circuits and transferring the image signal samples from the pixel circuits to a back-end signal processor creates challenges in designing an imaging IC, such as power detection threshold, image lag, power dissipation, and frame rate.

SUMMARY

A pixel circuit uses two storage transistors to store two image signal samples, which include a reference signal produced by background noise of the pixel circuit and a signal produced by optical exposure of a photodetector and the background noise of the pixel circuit. An imaging integrated circuit uses a pixel circuit array, which may contain a number of such pixel circuits, and a charge acquisition circuit configured to read out image information obtained by the pixel circuit array. The charge acquisition circuit uses a first amplifier and a serially connected differential integrator that includes a second amplifier, a first differential integrator section and a second differential integrator section for the read out. A method for image information acquisition involves obtaining image information using the pixel circuit array and reading out the image information obtained by the pixel circuit array using the charge acquisition circuit.

In an embodiment, a pixel circuit includes a photodetector, a readout circuit coupled to the photodetector, a first memory element coupled to the readout circuit, a second memory element coupled to the readout circuit, a first output switch circuit coupled to the first memory element and a first output port of the pixel circuit, a second output switch circuit coupled to the second memory element and a second output port of the pixel circuit, and a third output switch circuit coupled to the readout circuit, the first memory element, the second memory element and a common reference terminal of the pixel circuit. The first memory element includes a first storage transistor configured to store a reference signal produced by background noise of the pixel circuit. The second memory element includes a second storage transistor configured to store a signal produced by optical exposure of the photodetector and the background noise of the pixel circuit.

In an embodiment, an imaging IC includes a pixel circuit array and a charge acquisition circuit configured to read out image information obtained by the pixel circuit array. The pixel circuit array includes pixel circuits, where each of the pixel circuits is configured to store a reference signal produced by background noise of the pixel circuit and to store a signal produced by optical exposure of a photodetector of the pixel circuit and the background noise of the pixel circuit. The charge acquisition circuit includes a first amplifier and a differential integrator connected in series with the first amplifier. The differential integrator includes a second amplifier, a first differential integrator section and a second differential integrator section. The first amplifier is used as a common mode regulator for the second amplifier. Each of the first and second differential integrator sections includes a capacitor, a first switch, a second switch, and a third switch, where the capacitor is connected in series with the second switch, the first switch is connected in parallel with the capacitor and the second switch, and the third switch is connected to the capacitor, the second switch and a common mode reference voltage terminal. The first switch and the third switch are controlled by a first control signal and the second switch is controlled by a second control signal.

In an embodiment, a method for image information acquisition includes obtaining image information from a pixel circuit array having a plurality of pixel circuits and reading out the image information obtained by the pixel circuit array using a charge acquisition circuit. The image information from a pixel circuit of the plurality of pixel circuits includes a reference signal produced by background noise of the pixel circuit and a signal produced by optical exposure of a photodetector of the pixel circuit and the background noise of the pixel circuit. The charge acquisition circuit includes a first amplifier, a differential integrator connected in series with the first amplifier. The differential integrator includes a second amplifier, a first differential integrator section and a second differential integrator section. The first amplifier is used as a common mode regulator for the second amplifier, where each of the first and second integrator sections includes a capacitor, a first switch, a second switch, and a third switch. The capacitor is connected in series with the second switch, the first switch is connected in parallel with the capacitor and the second switch, and the third switch is connected to the capacitor, the second switch and a common mode reference voltage terminal. The first switch and the third switch are controlled by a first control signal and the second switch is controlled by a second control signal.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
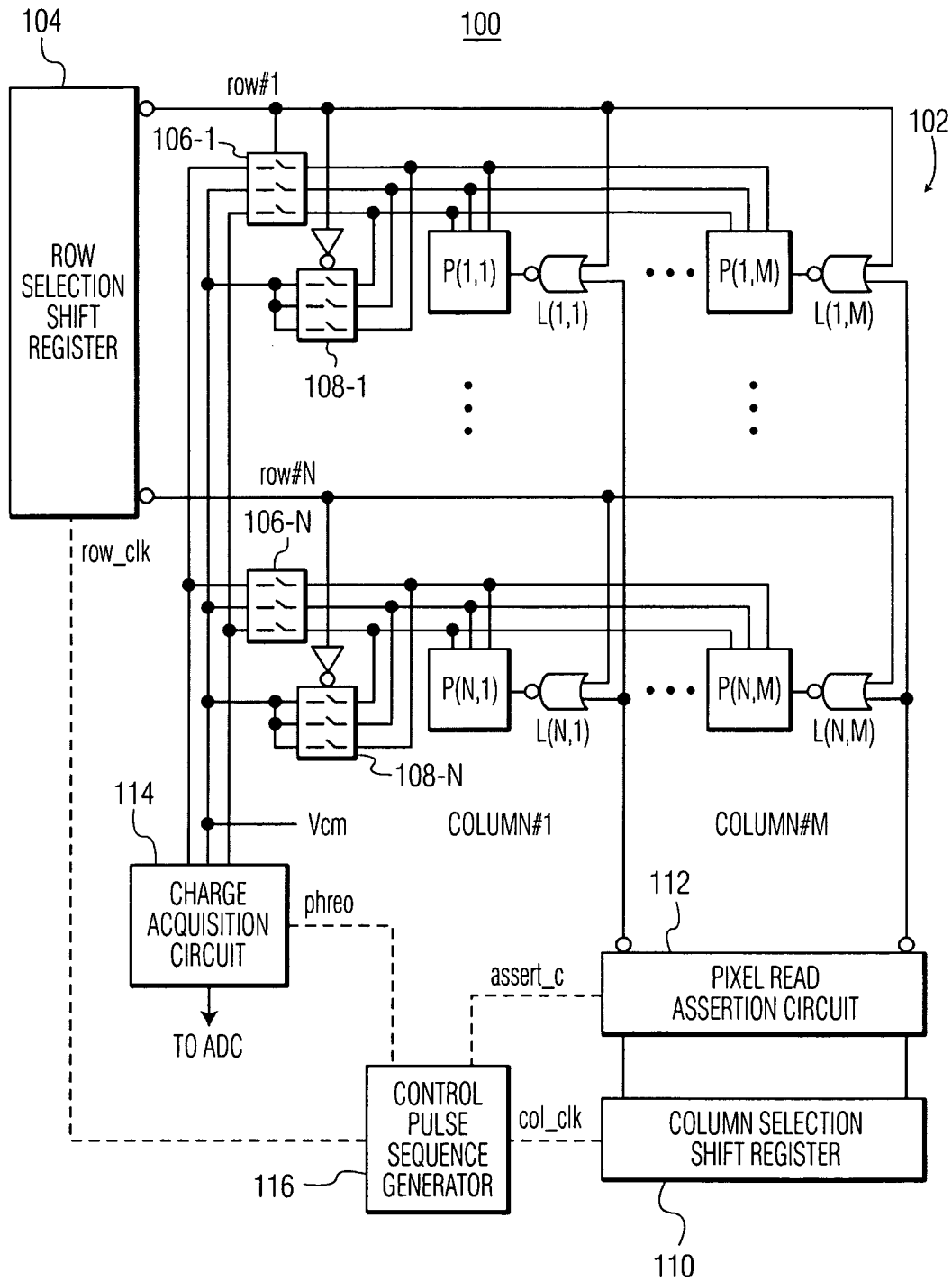
FIG. 1 is a schematic block diagram of an imaging IC in accordance with an embodiment of the invention.

FIG. 1 is a schematic block diagram of an imaging IC 100 in accordance with an embodiment of the invention. The imaging IC is configured to obtain image information using a pixel circuit array 102 and to read out the obtained image information from the pixel circuit array. The imaging IC can be used for motion estimation, such as in optical mouse and optical finger navigation devices. In addition, the imaging IC can be used for other applications.

In the embodiment depicted in FIG. 1, the imaging IC 100 includes the pixel circuit array 102, a row selection shift register 104, row selection switch circuits 106-1 . . . 106-N and 108-1 . . . 108-N, where N is a positive integer that is greater than one and represents the row number, a column selection shift register 110, a pixel read assertion circuit 112, a charge acquisition circuit 114 and a control pulse sequence generator 116. Although the imaging IC is depicted and described with certain components and functionality, other embodiments of the imaging IC may include fewer or more components to implement less or more functionality.

The pixel circuit array 102 of the imaging IC 100 is configured to obtain image information. In the embodiment depicted in FIG. 1, the pixel circuit array includes N rows and M columns of pixel circuits, P(1,1) . . . P(N,M), where N and M are both positive integers that are greater than one. For example, row 1 of the pixel circuit array includes pixel circuits P(1,1) to P(1,M), while row N of the pixel circuit array includes pixel circuits P(N,1) to P(N,M). In an embodiment, the pixel circuit array is separated into two or more sub-arrays of pixel circuits. In this case, each of the sub-arrays may have same numbers of rows and columns of pixel circuits. For example, in a typical optical mouse application, the pixel circuit array may include two sub-arrays of pixel circuits, each sub-array with thirty rows and sixteen columns of pixel circuits.

Each of the pixel circuits P(1,1) . . . P(N,M) of the pixel circuit array 102 is coupled to the row selection shift register 104 and the column selection shift register 110 through a corresponding one of logic NOR circuits L(1,1) . . . L(N,M). Each logic NOR circuit is configured to allow a corresponding pixel circuit that is coupled to the row and column selection shift registers through the logic NOR circuit to be selected for image information read out.

The row selection shift register 104 of the imaging IC 100 is configured to select a target row of pixel circuits P(1,1) . . . P(N,M) from the pixel circuit array 102 using the logic NOR circuits L(1,1) . . . L(N,M) for the target row. The image information of the selected row of pixel circuits is read out by the charge acquisition circuit 114.

In the embodiment depicted in FIG. 1, the pixel circuit array 102 is read in a row by row fashion. Row lines or conducting lines of a selected row of pixel circuits P(1,1) . . . P(N,M) are connected to the charge acquisition circuit 114. When an n-th row is selected for image information read out (n is a positive integer that is equal to or smaller than N), the switch circuit 106-$n$ at the nth row is closed and the switch circuit 108-$n$ is opened. The first reading of each row of pixel circuits is empty, which means that the conducting lines of the row are read without pixel selection or the reading is done for a dummy pixel to achieve the row readout reset. The reason for above is to remove the presence of unknown residual charge on the conducting lines connecting the particular row to the charge acquisition circuit.

The column selection shift register 110 and the pixel read assertion circuit 112 of the imaging IC 100 are configured to sequentially select the pixel circuits in a selected row of pixel circuits P(1,1) . . . P(N,M) for image information read out. In the embodiment depicted in FIG. 1, the column selection shift register is a circular shift register that sequentially selects columns of the pixel circuit array 102. The pixel read assertion circuit selectively routes a received read assertion signal to the different columns of the pixel circuit array in response to the sequential selections made by the column selection shift register to sequentially select the pixel circuits in the selected row of pixel circuits and to allow the pixel circuits in the selected row to be read out one by one. The pixel circuit selection within a row of pixel circuits is realized using the corresponding one of the logic NOR circuits L(1,1) . . . L(N,M) that is coupled to each pixel circuit of the selected row and to the pixel read assertion circuit. For example, the logic NOR circuit can use a logical low state for detecting row selection signal from the row selection shift register 104 and the assertion signal from the pixel read assertion circuit.

The charge acquisition circuit 114 of the imaging IC 100 is configured to read out image information obtained by the pixel circuit array 102. In the embodiment depicted in FIG. 1, the charge acquisition circuit transfers analog signals that represent the image information to an analog-to-digital converter (ADC), which converts the analog signals into digital signals.

The control pulse sequence generator 116 of the imaging IC 100 is configured to generate control signals to drive the row selection shift register 104, the column selection shift register 110, the pixel read assertion circuit 112, and the charge acquisition circuit 114. For example, the control pulse sequence generator may generate clock signal "row_clk" for the row selection shift register, clock signal "col_clk" for the column selection shift register, assertion signal "assert_c" for the pixel read assertion circuit, and control signal "phreo" for the charge acquisition circuit. In an embodiment, the control pulse sequence generator may be controlled by software stored in a computer readable medium, hardware, and/or a combination of software stored in a computer readable medium and hardware.

Figure 2:
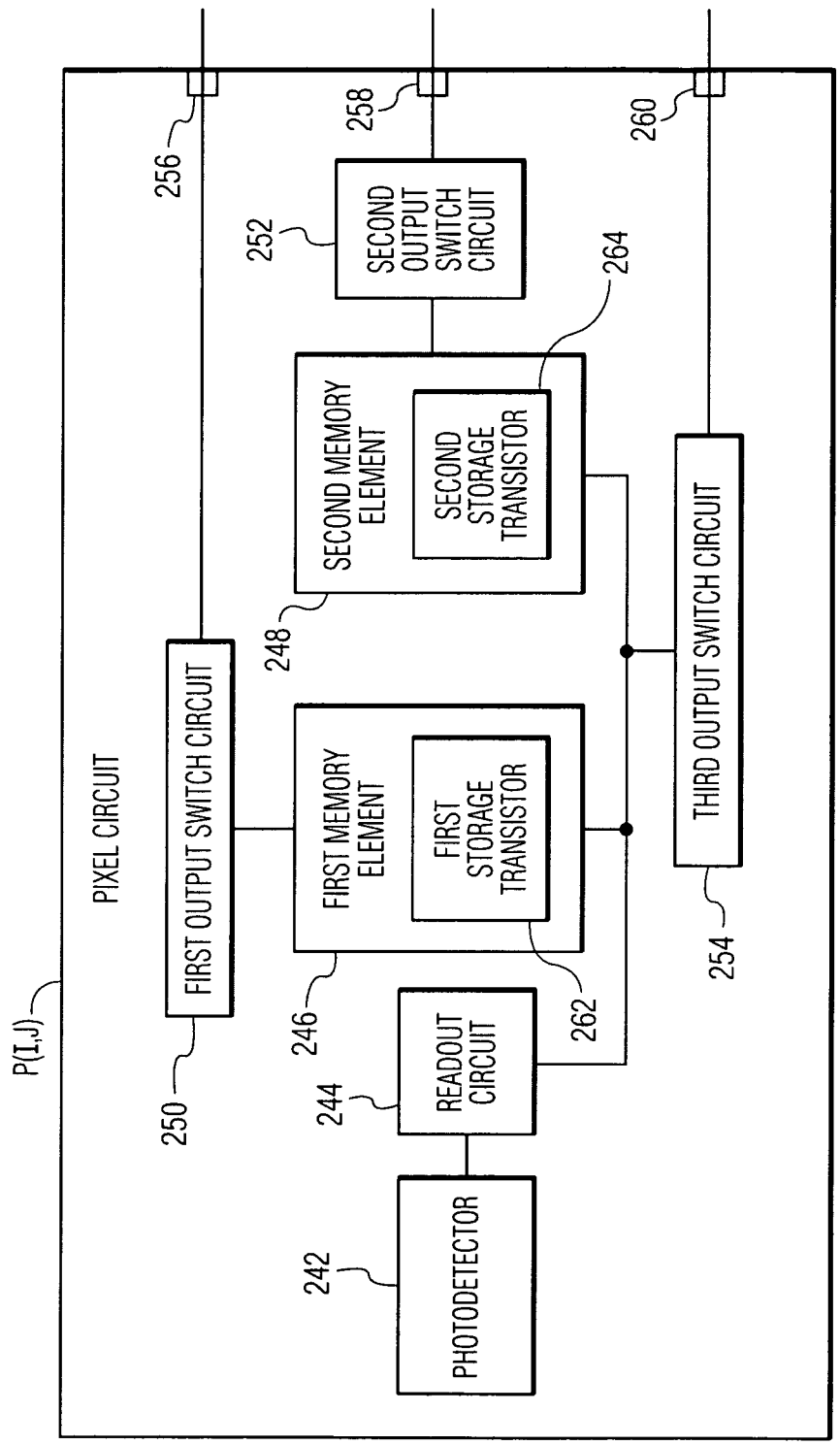
FIG. 2 depicts an embodiment of one of the pixel circuits depicted in FIG. 1.

In an embodiment, each of the pixel circuits P(1,1) . . . P(N,M) of the pixel circuit array 102 may store more than one image signal sample. For example, each pixel circuits can store two correlated image signal samples. FIG. 2 depicts such an embodiment of a pixel circuit depicted in FIG. 1. In the embodiment depicted in FIG. 2, the pixel circuit P(I,J), where I is a positive integer that is equal to or smaller than N, and J is a positive integer that is equal to or smaller than M, includes a photodetector 242, a readout circuit 244, a first memory element 246, a second memory element 248, a first output switch circuit 250, a second output switch circuit 252, an optional third output switch circuit 254, a first output port 256, a second output port 258 and a common reference terminal 260. The pixel circuit is configured to perform in-pixel information acquisition through correlated double sampling and to store the double sampling results separately in the first and second memory elements.

The photodetector 242 of the pixel circuit P(I,J) is configured to sense electromagnetic energy such as light. In an embodiment, the photodetector is a photodiode configured to convert light into either current or voltage.

The readout circuit 244 of the pixel circuit P(I,J) is coupled to the photodetector 242. In the embodiment depicted in FIG. 2, the readout circuit is configured to read out information that is sensed by the photodetector and/or produced by the background noise of the pixel circuit.

The first memory element 246 of the pixel circuit P(I,J) is coupled to the readout circuit 244. In the embodiment depicted in FIG. 2, the first memory element includes a first storage transistor 262 configured to store a reference signal produced by the background noise of the pixel circuit;

The second memory element 248 of the pixel circuit P(I,J) is also coupled to the readout circuit 244. In the embodiment depicted in FIG. 2, the second memory element includes a second storage transistor 264 configured to store a signal produced by optical exposure of the photodetector and the background noise of the pixel circuit;

The first output switch circuit 250 of the pixel circuit P(I,J) is coupled to the first memory element 246 and the first output port 256 of the pixel circuit. The first output switch circuit is configured to enable or to disable the output of the information stored at the first memory element to the first output port.

The second output switch circuit 252 of the pixel circuit P(I,J) is coupled to the second memory element 248 and the second output port 258 of the pixel circuit. The second output switch circuit is configured to enable or to disable the output of the information stored at the second memory element to the second output port.

In the embodiment depicted in FIG. 2, the third output switch circuit 254 of the pixel circuit P(I,J) is coupled to the readout circuit 244, the first memory element 246, the second memory element 248 and the common reference terminal 260 of the pixel circuit. The third output switch circuit is configured to connect or to disconnect the first and second memory elements to the common reference terminal. The common reference terminal is connected to a reference voltage.

In an embodiment, the first, second and third output switch circuits 250, 252, 254 are configured to be controlled by a single signal. By controlling the first, second and third output switch circuits under the same signal, the first, second and third output switch circuits can be simultaneously enabled to allow charges stored in the first and second memory elements 246, 248 to be simultaneously read out through the first output port 256 and the second output port 258.

Figure 3:
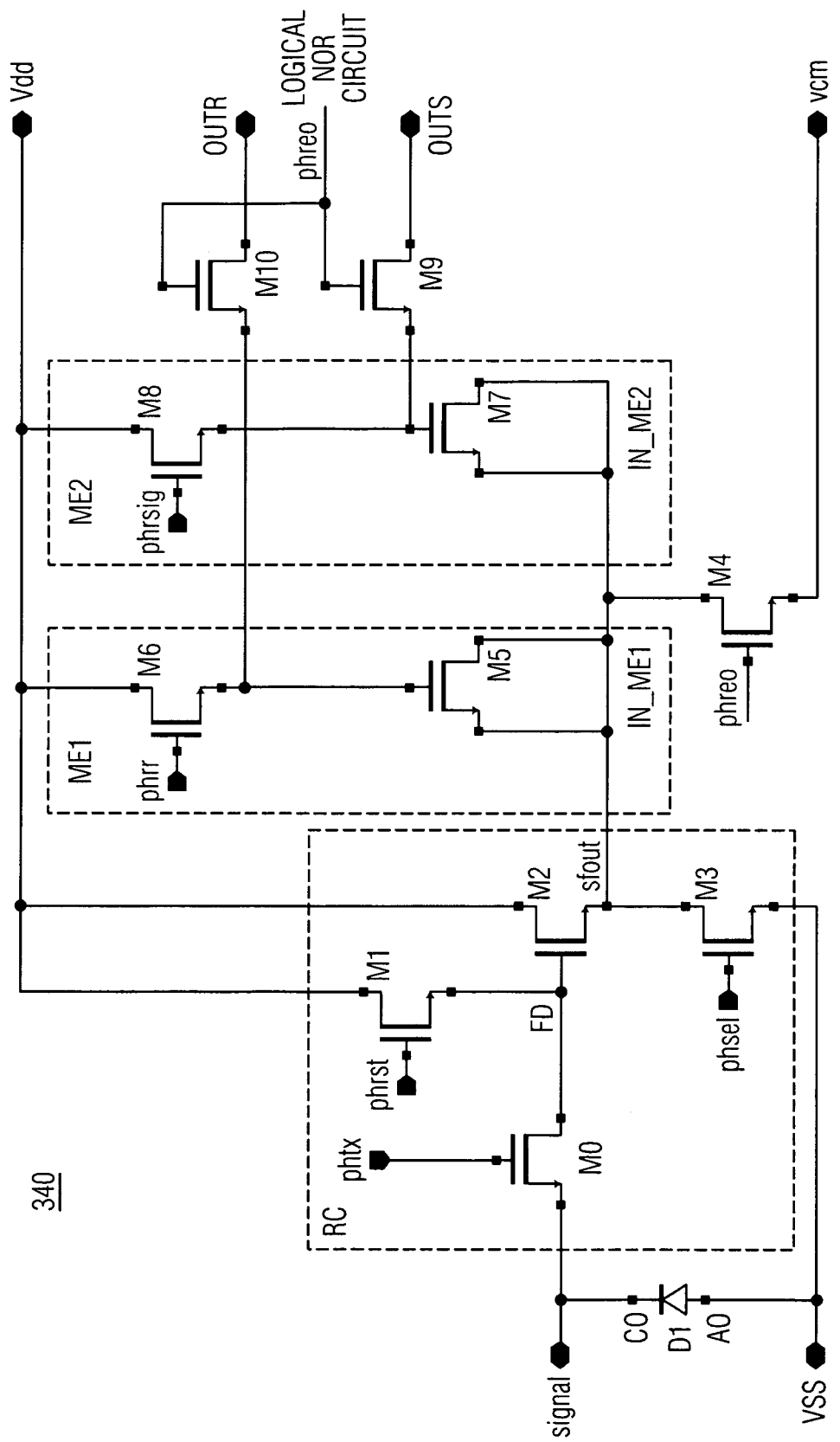
FIG. 3 is a circuit diagram of an embodiment of the pixel circuit depicted in FIG. 2.

In some embodiments, the photodetector 248 of the pixel circuit P(I,J) can be any type of a photodiode, such as a P-N photodiode or a p-i-n (or PIN) photodiode. A p-i-n photodiode is a photodiode that has an intrinsic (i) or undoped region between the n-doped and p-doped regions. FIG. 3 is a circuit diagram of such an embodiment of the pixel circuit depicted in FIG. 2. In the embodiment depicted in FIG. 3, the pixel circuit 340 includes a p-i-n photodiode "D1," a readout circuit "RC," a first memory element "ME1," a second memory element "ME2," a first output switch transistor "M10," a second output switch transistor "M9," a third output switch transistor "M4," a first output port "OUTR," a second output port "OUTS" and a common reference terminal "Vcm."

The readout circuit RC of the pixel circuit 340 includes a transfer gate transistor "M0," a reset transistor "M1," a source follower transistor "M2" and a current source transistor "M3." In the embodiment depicted in FIG. 3, the transfer gate transistor M0 is connected to the cathode "CO" of the photodiode D1, the reset transistor M1 is connected to the transfer gate transistor M0 and to a first voltage rail "Vdd" of the pixel circuit. The source follower transistor M2 is connected to the transfer gate transistor M0, the reset transistor M1 and the first voltage rail Vdd of the pixel circuit. In addition, the current source transistor M3 is connected to the source follower transistor M2 and to a second voltage rail "Vss" of the pixel circuit. Furthermore, the anode "AO" of the photodiode D1 is connected to the second voltage rail Vss of the pixel circuit. In an embodiment, the voltage of the first voltage rail Vdd is higher than the voltage of the second voltage rail Vss.

The first memory element ME1 of the pixel circuit 340 includes a first storage transistor "M5" and a first switch transistor "M6." The first storage transistor M5 is configured to store a reference signal produced by background noise of the pixel circuit 340. The first switch transistor M6 is connected to the first voltage rail Vdd and the first storage transistor M5 and is configured to allow or to disallow the reference signal to be stored at the first storage transistor M5.

The second memory element ME2 of the pixel circuit 340 includes a second storage transistor "M7" and a second switch transistor "M8." The second storage transistor M7 is configured to store a signal produced by optical exposure of the p-i-n photodiode D1 and the background noise of the pixel circuit 340. The second switch transistor M8 is connected to the first voltage rail Vdd and the second storage transistor M7 and is configured to allow or to disallow the signal produced by the optical exposure of the p-i-n photodiode D1 and the background noise of the pixel circuit 340 to be stored at the second storage transistor M7.

The first and second storage transistors M5 and M7 of the first and second memory elements ME1 and ME2 can be replaced by area efficient capacitors. In an embodiment, the first and second storage transistors M5 and M7 are metal-oxide-semiconductor (MOS) transistors.

In the embodiment depicted in FIG. 3, the first and second memory elements ME1 and ME2 are analog memory circuits that operate in track and hold mode during an image information acquisition process of the pixel circuit 340. After the image information acquisition process, electric charges are read out from the first and second memory elements ME1 and ME2 simultaneously when the first, second and third output switch transistors M10, M9, and M4 are turned on to connect the memory elements ME1 and ME2 to the charge acquisition circuit 114 (shown in FIG. 1). Input ports "IN_ME1" and "IN_ME2" of the first and second memory elements ME1 and ME2 are connected to an output port "sfout" of the source follower transistor M2.

The first output switch transistor M10 of the pixel circuit 340 is connected to the first storage transistor M5 and the first switch transistor M6 of the first memory element ME1. The first output switch transistor M10 is also connected to the first output port OUTR of the pixel circuit 340. The first output switch transistor M10 is configured to enable or to disable the output of the stored information at the first memory element ME1 to the first output port OUTR of the pixel circuit 340.

The second output switch transistor M9 of the pixel circuit 340 is connected to the second storage transistor M7 and the second switch transistor M8 of the second memory element ME2. The second output switch transistor M9 is also connected to the second output port OUTS of the pixel circuit 340. The second output switch transistor M9 is configured to enable or to disable the output of the stored information at the second memory element ME2 to the second output port OUTS of the pixel circuit 340.

The third output switch transistor M4 of the pixel circuit 340 is connected to the first storage transistor M5 of the first memory element ME1 and the second storage transistor M7 of the second memory element ME2. The third output switch transistor M4 is also connected to the common reference terminal Vcm of the pixel circuit 340. In the embodiment depicted in FIG. 3, the third output switch transistor M4 is configured to connect or disconnect the first and second memory elements ME1 and ME2 to the common reference terminal Vcm of the pixel circuit 340, which is connected to a reference voltage.

The first, second and third output switch transistors M10, M9, and M4 can be controlled by the same signal to transfer information stored in the first and second storage transistors M5 and M7 to the charge acquisition circuit 114 (shown in FIG. 1) through the two output ports OUTR and OUTS and the common reference terminal Vcm. In the embodiment depicted in FIG. 3, the control signal "phreo" of the first, second and third output switch transistors M10, M9, and M4 is outputted from one of the logic NOR circuits L(1,1) . . . L(N,M) depicted in FIG. 1.

Figure 4:
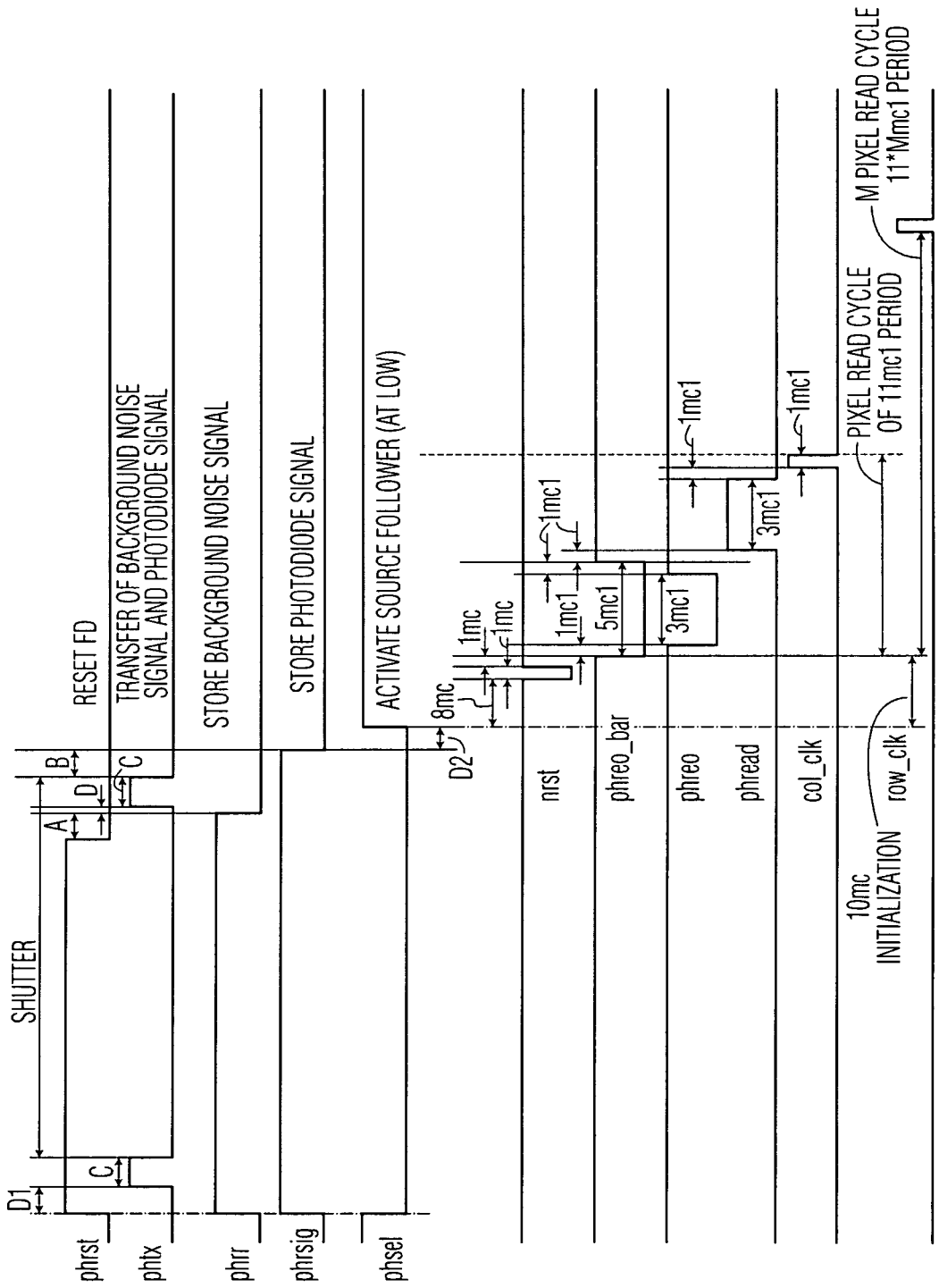
FIG. 4 is a time-based graph showing examples of image circuit control signals.

FIG. 4 is a time-based graph showing examples of image circuit control signals. Signals that are used to control the pixel circuit 340 depicted in FIG. 3 are shown on the upper part of FIG. 4. The signals that are used to control the pixel circuit 340 can also be referred to as pixel circuit control signals. Specifically, control signals are applied to terminals "phrst," "phtx," "phrr," "phrsig," and "phsel" to control the reset transistor M1, the transfer gate transistor M0, the first switch transistor M6 of the first memory element ME1, the second switch transistor M8 of the second memory element ME2, and the current source transistor M3, respectively. The control signals that are applied to the terminals "phrst," "phtx," "phrr," "phrsig," and "phsel" are referred to as control signals "phrst," "phtx," "phrr," "phrsig," and "phsel." During in-pixel image information acquisition in the pixel circuit 340, the pixel circuit control signals are at their default states. When an in-pixel image information acquisition is accomplished, the pixel circuit control signals return to and remain in their default states until the next image information acquisition. The control signals "phrst," "phtx," "phrr," and "phrsig" are logical signals that have a logic high state and a logic low state. In an embodiment, the nominal logical states of the control signals are defined as: when the voltage of a control signal is equal to or lower than a 0 Volt (V), the control signal is deemed as being logical low and when the voltage of a control signal is equal to or greater than 3.3V, the control signal is deemed as being logical high. The electric potential applied to the "phsel" terminal of the circuit 340, which is generated during the "phsel" control signal being at logical low state, allows few micro-amperes value of the current in the current source transistor M3 when the electric potential at the "phsel" terminal is slightly above the threshold potential of the current source transistor M3. The current in the current source transistor M3 is turned off when the control signal is at logical high state, making the electric potential applied at the "phsel" terminal equal to zero. The control signals of the pixel circuit are listed in the following table with description of purposes and logical states or value.

| Control signal name | Control signal purpose | Logical state/value when function is active |
|---|---|---|
| phrst | Resets floating diffusion and presents large signal (stress) to the source follower transistor | High |
| phsel | Turns on the current source transistor or the source follower transistor | Low |
| phtx | Turns on the transfer gate transistor to connect the p-i-n photodiode and floating diffusion | High |
| phrr | Turns on/off acquisition into analog memory: track/hold mode | High/Low |
| phrsig | Turns on/off acquisition into analog memory: track/hold mode | High/Low |

Some examples of the operation of the pixel circuit 340 under the control of the signals illustrated in FIG. 4 are described below. In the operation examples, the reset and acquisition of electric charge from the p-i-n photodiode D1 is directed to a floating diffusion node, which is designated as "FD'" in FIG. 3. In addition, signal timing is specified in units or periods of the system master clock time of the pixel circuit 340, which is designated as "mc" at FIG. 4. For example, a 50 MHz master clock specifies a timing unit mc that is equal to 20 nanoseconds (ns). In the image information acquisition process shown in FIG. 4, signal time duration periods are in A, B, C, D, D1 and D2 mc. In an embodiment, A is equal to 10, C is equal to 10, and D is equal to 1.

At the beginning of the image information acquisition process of the pixel circuit 340, the "phrst" control signal of the transfer gate transistor M0 and the control signals "phrr" and "phrsig" of the memory elements ME1 and ME2 go to logical high states together. The control signals "phrr" and "phrsig" turn on the switch transistors M6 and M8 of the memory elements ME1 and ME2 and allow tracking of the floating diffusion node FD by the memory transistors M5 and M7 of the memory elements ME1 and ME2 through the output signal at the output port sfout of the source follower transistor M2. After a delay time duration of D1 mc, the transfer gate transistor M0 is turned on for the first time in the acquisition cycle for a time duration of C mc, allowing the p-i-n photodiode D1 to be reset by switching the control signal "phtx" to the logical high state. When the transfer gate transistor M0 is turned off, the electronic shutter operation of the pixel circuit 340 is initialized. During the electronic shutter operation, a time duration of A plus D mc prior to turning on the transfer gate transistor M0 for the second time, the reset transistor M1 is turned off by switching the control signal "phrst" to the logical low state. A time duration of A mc after the control signal "phrst" changes to the logical low state, the control signal "phrr" changes to the logical low state. In addition, this transition of the control signal "phrr" occurs a time duration of D mc prior to turning the transfer gate transistor M0 on for the second time. After the control signal "phrr" changes to the logical low state, the background noise of the pixel circuit 340 is stored in the memory transistor M5. Exposure generated signal of the p-i-n photodiode D1 and the background noise of the pixel circuit 340 is stored in the memory transistor M7 when the control signal "phrsig" is reset to logical low, which occurs a time duration of B mc after the transfer gate transistor is open for the second time, i.e., when the control signal "phtx" is switched to logical low for the second time. Ideally, the delays for the hold mode switching are equal for the reset and exposure signals, i.e., A is equal to B. For example, A and B are both equal to 10. D2 master clocks after the resetting the control signal "phrsig" to logical low, the source follower transistor M2 is deactivated by switching the control signal "phsel" to the logical high state. By switching the control signal "phsel" to the logical high state, the voltage applied to the "phsel" terminal is nullified and becomes equal to ground potential and the source follower transistor M2 is deactivated. Upon deactivation of the source follower transistor M2, the in-pixel signal acquisition is accomplished.

The electronic shutter duration of the pixel circuit 340 can exceed 22 master clocks when A and B are both equal to 10. For a master clock period of 20 ns, the shortest electronic shutter duration is over 440 ns. To allow the electronic shutter duration as short as 200 ns with maintaining the master clock of 20 ns period, the values of A, B and C have to be reduced to 4. Shortening of the electronic shutter duration may require higher source follower operational current because faster charging of the analog memory elements is needed.

Figure 5:
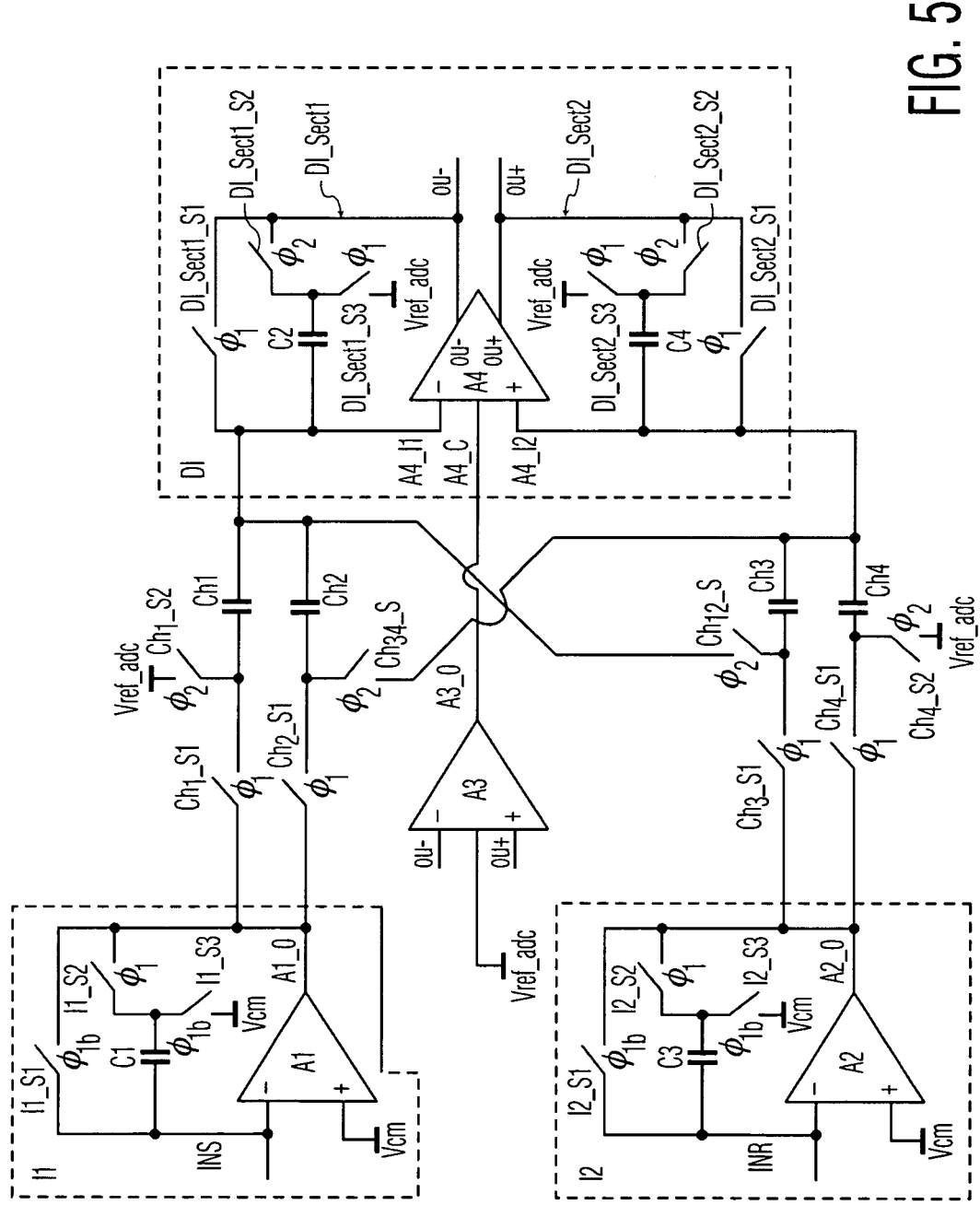
FIG. 5 depicts an embodiment of the charge acquisition circuit depicted in FIG. 1.

FIG. 5 depicts an embodiment of the charge acquisition circuit 114 depicted in FIG. 1. In the embodiment depicted in FIG. 5, the charge acquisition circuit 514 includes an integrator "I1" that includes an amplifier "A1," an integrator "I2" that includes an amplifier "A2," an amplifier "A3," a differential integrator "DI" that includes an amplifier "A4," parallel connected first and second storage capacitors "Ch$_1$" and "Ch$_2$" coupled to the integrator I1 and the differential integrator DI, and parallel connected third and fourth storage capacitors "Ch$_3$" and "Ch$_4$" coupled to the integrator I2 and the differential integrator DI. Although the charge acquisition circuit is depicted and described with certain components and functionality, other embodiments of the charge acquisition circuit may include fewer or more components to implement less or more functionality. For example, the charge acquisition circuit may not include the integrator I1 and/or the integrator I2 in some embodiments.

The amplifier A1 of the charge acquisition circuit 514 includes a first input terminal labeled as "INS," a second input terminal connected to a common reference voltage "Vcm," and an output terminal "A1_O" that is coupled to two storage capacitors Ch$_1$ and Ch$_2$. The amplifier A2 of the charge acquisition circuit includes a first input terminal labeled as "INR," a second input terminal connected to the common reference voltage Vcm, and an output terminal "A2_O" that is coupled to two storage capacitors Ch$_3$ and Ch$_4$. When the charge acquisition circuit 514 acquires image information stored in the pixel circuit 340 in the embodiment depicted in FIG. 3, the first input terminal INR of the amplifier A2 is connected to the first output port OUTR of the pixel circuit 340, the first input terminal INS of the amplifier A1 is connected to the second output port OUTS of the pixel circuit 340, and the common reference voltage Vcm of the charge acquisition circuit 514 is connected to the common reference terminal Vcm of the pixel circuit 340.

The integrator I1 of the charge acquisition circuit 514 includes the amplifier A1. The integrator I1 also includes a feedback capacitor "C$_1$," a first switch "I1_S1" that is controlled by the signal $\phi_{1b}$, a second switch "I1_S2" that is controlled by the signal $\phi_1$, and a third switch "I1_S3" that is controlled by the signal $\phi_{1b}$. The feedback capacitor C$_1$ is connected with the second switch I1_S2, the first switch I1_S1 is connected in parallel with the feedback capacitor C$_1$ and the second switch I1_S2, and the third switch I1_S3 is connected to the feedback capacitor C$_1$ and the second switch I1_S2 and to the common reference voltage Vcm. In addition, the first switch I1_D1 and the feedback capacitor C$_1$ are connected to the first input terminal INS of the amplifier A1 and the first and second switches I1_S1 and I1_S2 are connected to the output terminal A1_O of the amplifier A1.

The integrator I2 of the charge acquisition circuit 514 includes the amplifier A2, a feedback capacitor "C$_3$", a first switch "I2_S1" that is controlled by the signal $\phi_{1b}$, a second switch "I2_S2" that is controlled by the signal $\phi_1$, and a third switch "I2_S3" that is controlled by the signal $\phi_{1b}$. As shown in FIG. 5, the integrator I2 has a similar configuration as the integrator I1. In the embodiment depicted in FIG. 5, the integrators I1 and I2 acquire electric charges from the first and second memory elements ME1 and ME2 of a target pixel circuit 340 (shown in FIG. 3) simultaneously presented at the input terminals of the amplifiers A1 and A2 when the switches I1_S2 and I2_S2 are closed by the control signal $\phi_1$.

The first and second storage capacitors Ch$_1$ and Ch$_2$ are coupled to the integrator I1 and the differential integrator DI. The third and fourth storage capacitors Ch$_3$ and Ch$_4$ are coupled to the integrator I2 and the differential integrator DI. The second and fourth storage capacitors Ch$_2$ and Ch$_4$ are used for the gain control. In an embodiment, each of the capacitors Ch$_1$, Ch$_2$, Ch$_3$ and Ch$_4$ has same capacity with regard to capacitance. Upon accomplishing of the image information acquisition phase under the control of the signal $\phi_1$, pixel signals from the memory elements ME1 and ME2 of a target pixel 340 (shown in FIG. 3) are stored in the capacitors Ch1, Ch2, Ch3 and Ch4.

In the embodiment depicted in FIG. 5, each of the first, second, third, and fourth storage capacitors Ch$_1$, Ch$_2$, Ch$_3$ and Ch$_4$ is connected in series with a switch or a switch circuit "Ch$_1$_S1," "Ch$_2$_S1," "Ch$_3$_S1" or "Ch$_4$_S1," which is controlled by the control signal $\phi_1$, to the output terminal A1_O or A2_O of the amplifier A1 or A2. The first storage capacitor Ch$_1$ and the switch Ch$_1$_S1 is connected in parallel with the second storage capacitor Ch$_2$ and the switch Ch$_2$_S1. The third storage capacitor Ch$_3$ and the switch Ch$_3$_S1 is connected in parallel with the fourth storage capacitor Ch$_4$ and the switch Ch$_4$_S1. In addition, a switch or a switch circuit "Ch$_1$_S2," which is controlled by the control signal $\phi_2$, is connected to the first storage capacitor Ch$_1$ and the switch Ch$_1$_S1 and to a terminal for a reference voltage "Vref_adc," which is also referred to as the common mode reference voltage Vref_adc. The common mode reference voltage Vref_adc may be the same of the common reference voltage Vcm or different from the common reference voltage Vcm. A switch or a switch circuit "Ch$_4$_S2," which is controlled by the control signal $\phi_2$, is connected to the fourth storage capacitor Ch$_4$ and the switch Ch$_4$_S1 and to the reference voltage Vref_adc. Furthermore, as shown in FIG. 5, the first and second storage capacitors Ch$_1$ and Ch$_2$ are connected to a switch or a switch circuit "Ch$_{12}$_S," which is controlled by the control signal $\phi_2$ and is connected to the third storage capacitor Ch$_3$ and the switch Ch$_3$_S1. The third and fourth storage capacitors Ch$_3$ and Ch$_4$ are connected to a switch or a switch circuit "Ch$_{34}$_S," which is controlled by the signal $\phi_2$ and is connected to the second storage capacitor Ch$_2$ and the switch Ch$_2$_S1.

The amplifier A3 of the charge acquisition circuit 514 includes a first input terminal "ou−," a second input terminal "ou+," a common reference terminal that is connected to the reference voltage Vref_adc, and an output terminal "A3_O." The amplifier A4 of the charge acquisition circuit 514 is part of the differential integrator DI. The amplifier A4 includes a first input terminal "A4_I1," a second input terminal "A4_I2," a common reference terminal "A4_C" that is connected to the output terminal A3_O of the amplifier A3, a first output terminal "ou−," and a second output terminal "ou+." The first output terminal ou− and a second output terminal ou+ of the amplifier A4 are connected to output terminals "ou+" and "ou−" of the differential integrator DI, respectively. The amplifier A3 is used as a common mode regulator for the amplifier A4. In the embodiment depicted in FIG. 5, the amplifier A3 allows matching of the common mode voltage of the readout output signal of the charge acquisition circuit 514 to the common mode reference voltage Vref_adc that is applied by an ADC.

Beside the amplifier A4, the differential integrator DI also includes a first differential integrator section "DI_Sect1" and a second differential integrator section "DI_Sect2." The first differential integrator sections DI_Sect1 includes a capacitor "C$_2$," a first switch "DI_Sect1_S1" that is controlled by the signal $\phi_1$, a second switch "DI_Sect1_S2" that is controlled by the signal $\phi_2$, and a third switch "DI_Sect1_S3" that is controlled by the signal $\phi_1$. The capacitor C$_2$ is connected in series with the second switch DI_Sect1_S2, the first switch DI_Sect1_S1 is connected in parallel with the capacitor C$_2$ and the second switch DI_Sect1_S2, and the third switch DI_Sect1_S3 is connected to the capacitor C$_2$ and the second switch DI_Sect1_S2 and to the reference voltage Vref_adc. In addition, the first switch DI_Sect1_S1 and the capacitor C$_2$ are connected to a corresponding input terminal A4_I1 of the amplifier A4. The first switch DI_Sect1_S1 and the capacitor C$_2$ are also connected to the output terminal ou− of the fourth amplifier A4.

The second differential integrator section DI_Sect2 includes a capacitor "C$_4$," a first switch "DI_Sect2_S1" that is controlled by the signal $\phi_1$, a second switch "DI_Sect2_S2" that is controlled by the signal $\phi_2$, and a third switch "DI_Sect2_S3" that is controlled by the signal $\phi_1$. As shown in FIG. 5, the second differential integrator section DI_Sect2 has a similar configuration as the first differential integrator sections DI_Sect1. Under the control of the signal $\phi_2$, the charge difference stored in the storage capacitors Ch$_1$, Ch$_2$, Ch$_3$ and Ch$_4$ is presented to the capacitors C$_2$, C$_4$ of the differential integrator DI. Specifically, the switches DI_Sect1_S1, DI_Sect1_S3, DI_Sect2_S1 and DI_Sect2_S3 controlled by the signal $\phi_1$ are open or disabled and the switches DI_Sect1_S2 and DI_Sect2_S2 controlled by the signal $\phi_2$ are closed or enabled. Electric charge stored in the capacitors C$_2$ and C$_4$ of the differential integrator DI is introduced to an ADC (not shown) through output terminals ou+ and ou− of the differential integrator DI.

The voltage offset compensation for the amplifiers A1, A2 and A4 of FIG. 5 is implemented as follows. When the amplifiers A1, A2 and A4 are not used in integrator modes, the offset voltages are stored in the capacitors C1, C2, C3 and C4. In the integrator modes, the offset voltages are subtracted from the output voltages of the integrators I1, I2 and DI built around the amplifiers A1, A2 and A4. The control signal $\phi 1b$ is used for the offset compensation in the amplifiers A1 and A2 while the control signal $\phi 1$ is used for the offset compensation in the amplifier A4. In an embodiment, only one of the control signals $\phi 1$, $\phi 2$ and $\phi 1b$ is active at a time, i.e., switches that are controlled by one of the control signals are closed while or before the other switches that are controlled by other control signals are open.

Signals that are used to control the charge acquisition circuit 514 in the embodiment depicted in FIG. 5 are shown on the lower part of FIG. 4. As described above, the charge acquisition circuit 514 is controlled by signals $\phi_{1b}$, $\phi_1$, and $\phi_2$. The control signal $\phi_{1b}$ of FIG. 5 corresponds to the control signal "phreo_bar" of FIG. 4, the control signal $\phi_1$ of FIG. 5 corresponds to the control signal "phreo" of FIG. 4, and the control signal $\phi_2$ of FIG. 5 corresponds to the control signal "phread" of FIG. 4. Some examples of the operation of the charge acquisition circuit 514 of FIG. 5 under the control of the signals illustrated in the lower part of FIG. 4 are described below. In the operation examples, signal timing is specified in units or periods of the system master clock of the pixel circuit 340 (as shown in FIG. 3), which is designated as "mc" at FIG. 4.

As shown in FIG. 4, an initialization time of 10 mc precedes the start of the charge acquisition. During the initialization, the charge acquisition circuit 514 is reset using 1 mc long negative logic signal designated as "nrst." For the charge acquisition, the control signal timing is specified in units of mc1, which may be equal to or longer than one mc. The logic state of the control signal "phreo_bar" is switched from an initial logical high state to a logical low state and stays at the logical low state for a time duration of five mc1. The control signal "phreo" is switched from an initial logical high state to a logical low state in one mc1 after the control signal "phreo_bar" is switched to the logical low state. After switched to the logical low state, the control signal "phreo" returns back to the logical high state after a time duration of three mc1. The control signal "phread" is switched from an initial logical low state to a logical high state in a time duration of one mc1 upon the transition of the control signal "phreo_bar" from the logical low state to the logical high state. After being switched to the logical high state, the control signal "phread" stays at the logical high state for a time duration of three mc1. When the control signal "phread" is at the logical high state, the pixel data is transferred to the outputs terminals of the charge acquisition circuit 514 and is presented to the inputs of the connected ADC. A time duration of one mc1 after the transition of the control signal "phread" from the logical high state to the logical low state, the column select shift register 110 is clocked by switching the clock signal "col_clk" from an initial logical low state to a logical high state for one mc1.

Although not shown in FIG. 4, one mc1 after the clock signal "col_clk" returns to the logical low state, the control signal "phreo_bar" is switched to the logical low state and the read cycle for next pixel in a selected row is started. After one pixel is read out, the reading sequence is continued for the rest of pixels in the selected row with periods of eleven mc1. The time for reading an entire row of pixel circuits is equal to the result of periods of eleven mc1 multiplied by the number of pixel circuits in the row.

As shown in FIG. 4, the clock signal "row_clk" is set to the logical high for one mc1 after reading an entire row of pixel circuits. For a full frame of N rows and M columns of pixel circuits, the full frame can be read out in a time period of (N*mc+shutter+B+C+11*M*N*mc1), where the 'shutter', 'B', 'C' are specified in units of mc. With a 20 ns master clock period, a readout frame rate of 8000 frames/second can be supported with 0.2 microseconds (μs) to 15.88 μs shutter times for a 31×32 pixel circuit array.

Figure 6:
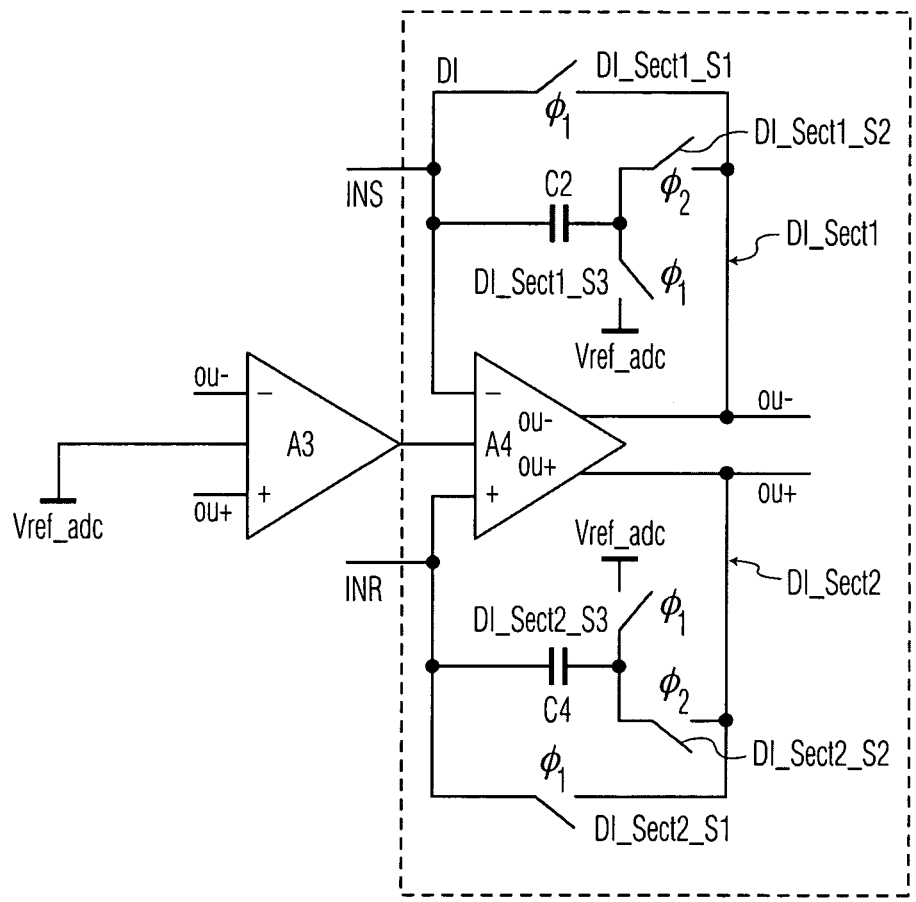
FIG. 6 depicts another embodiment of the charge acquisition circuit depicted in FIG. 1.

In other embodiments, the charge acquisition circuit 514 may not include the integrators I1 and I2. For example, FIG. 6 depicts such an embodiment of the charge acquisition circuit 514 without the integrators I1 and I2. In the charge acquisition circuit 614 depicted in FIG. 6, the control signal φ1 is used for reset and the control signal φ2 is used for read operation. Compared to the charge acquisition circuit 514 in FIG. 5, the acquisition cycle duration of the charge acquisition circuit 614 in FIG. 6 may be reduced by a few master clocks.

When the imaging IC 100 of FIG. 1 is implemented Complementary metal-oxide-semiconductor (CMOS) technology, low optical power detection threshold with no image lag, little electric power dissipation together with high frame rate operation can be achieved. With a p-i-n photodiode array, in-pixel correlated double sampling, and high speed charge signal transfer from individual pixels to back-end signal processor, the imaging IC of FIG. 1 can reach a frame rate of 8000 frames per second with a 50 MHz master clock with optical power detection threshold of 10 picoWatts.

Figure 7:
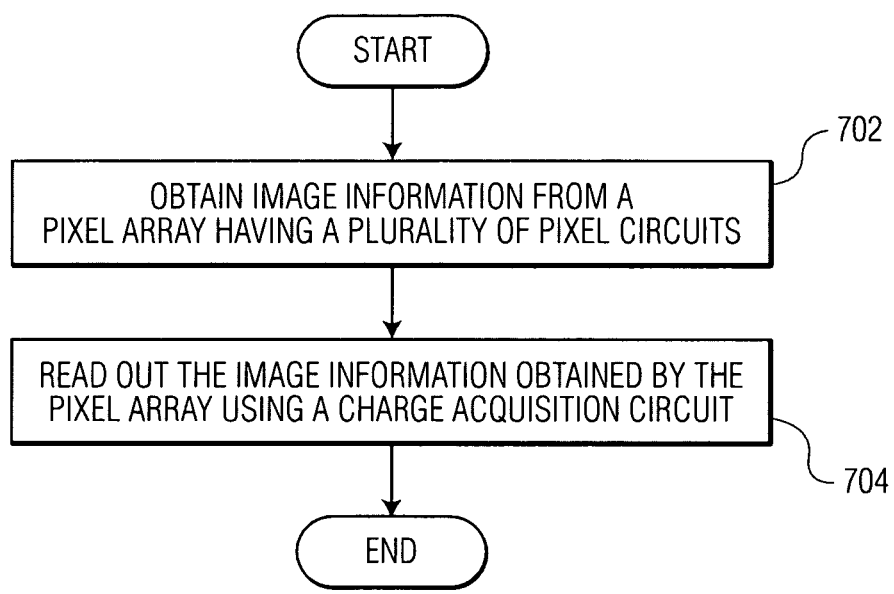
FIG. 7 is a process flow diagram of a method for image information acquisition in accordance with an embodiment of the invention.

FIG. 7 is a process flow diagram of a method for image information acquisition in accordance with an embodiment of the invention. At block 702, image information from a pixel circuit array having a plurality of pixel circuits is obtained, where the image information from a pixel circuit of the plurality of pixel circuits includes a reference signal produced by background noise of the pixel circuit and a signal produced by optical exposure of a photodetector of the pixel circuit and the background noise of the pixel circuit. At block 704, the image information obtained by the pixel circuit array is read out using a charge acquisition circuit. The charge acquisition circuit includes a first amplifier, a differential integrator connected in series with the first amplifier, where the differential integrator includes a second amplifier, a first differential integrator section and a second differential integrator section. The first amplifier is used as a common mode regulator for the second amplifier. Each of the first and second integrator sections includes a capacitor, a first switch, a second switch, and a third switch, where the capacitor is connected in series with the second switch, the first switch is connected in parallel with the serially connected feedback capacitor and the second switch, and the third switch is connected to the capacitor, the second switch and a common mode reference voltage terminal. The first switch and the third switch are controlled by a first control signal and the second switch is controlled by a second control signal. In some embodiments, the charge acquisition circuit is the charge acquisition circuit 514 in the embodiment depicted in FIG. 5 or the charge acquisition circuit 614 in the embodiment depicted in FIG. 6.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. An imaging integrated circuit, the imaging integrated circuit comprising:
    a pixel circuit array, wherein the pixel circuit array comprises a plurality of pixel circuits, and wherein each pixel circuit of the plurality of pixel circuits is configured to store a reference signal produced by background noise of the pixel circuit and to store a signal produced by optical exposure of a photodetector of the pixel circuit and the background noise of the pixel circuit; and
    a charge acquisition circuit configured to read out image information obtained by the pixel circuit array, wherein the charge acquisition circuit comprises:
    a first amplifier;
    a differential integrator connected in series with the first amplifier, wherein the differential integrator comprises:
    a second amplifier, wherein the first amplifier is used as a common mode regulator for the second amplifier;
    a first differential integrator section; and
    a second differential integrator section,
    wherein each of the first and second differential integrator sections includes a capacitor, a first switch, a second switch, and a third switch, wherein the capacitor is connected in series with the second switch, the first switch is connected in parallel with the capacitor and the second switch, and the third switch is connected to the capacitor, the second switch and a common mode reference voltage terminal, and wherein the first switch and the third switch are controlled by a first control signal and the second switch is controlled by a second control signal.

2. The imaging integrated circuit of claim 1, wherein the charge acquisition circuit further comprises:
    a second integrator that includes a third amplifier;
    a third integrator that includes a fourth amplifier;
    first and second storage capacitors coupled to the second integrator and the differential integrator; and
    third and fourth storage capacitors coupled to the third integrator and the differential integrator.

3. The imaging integrated circuit of claim 1, further comprising:
    logic NOR circuits that are connected to each pixel circuit of the pixel circuit array for selective read out;
    a row selection shift register connected to the logic NOR circuits;
    a pixel read assertion circuit connected to the logic NOR circuits;
    a column selection shift register connected to the pixel read assertion circuit; and
    a control pulse sequence generator connected to the row selection shift register, the pixel read assertion circuit and the column selection shift register to provide control signals.

4. The imaging integrated circuit of claim 2, wherein each of the third and fourth amplifiers comprises:
    a first input terminal connected to the pixel circuit array;

a second input terminal connected to a reference voltage terminal; and an output terminal coupled to the first and second storage capacitors or the third and fourth storage capacitors.

5. The imaging integrated circuit of claim 4, wherein the first storage capacitor is connected in series with a first switch circuit to the output terminal of the third amplifier, the second storage capacitor is connected in series with a second switch circuit to the output terminal of the third amplifier, the third storage capacitor is connected in series with a third switch circuit to the output terminal of the fourth amplifier, and the fourth storage capacitor is connected in series with a fourth switch circuit to the output terminal of the fourth amplifier, wherein the first storage capacitor and the first switch circuit is connected in parallel with the second storage capacitor and the second switch circuit, the third storage capacitor and the third switch circuit is connected in parallel with the fourth storage capacitor and the fourth switch circuit, wherein a fifth switch circuit is connected to the first storage capacitor and the first switch circuit and to the common mode reference voltage terminal, a sixth switch circuit is connected to the fourth storage capacitor and the fourth switch circuit and to the common mode reference voltage terminal, and wherein the first and second storage capacitors are connected to a seventh switch circuit, which is connected to the third storage capacitor and the third switch circuit, the third and fourth storage capacitors are connected to a eighth switch circuit, which is connected to the second storage capacitor and the second switch circuit.

6. The imaging integrated circuit of claim 4, wherein each pixel circuit of the pixel circuit array further comprises:
a readout circuit coupled to the photodetector;
a first memory element coupled to the readout circuit, the first memory element comprising a first storage transistor configured to store the reference signal produced by the background noise of the pixel circuit;
a second memory element coupled to the readout circuit, the second memory element comprising a second storage transistor configured to store the signal produced by the optical exposure of the photodetector and the background noise of the pixel circuit;
a first output switch circuit coupled to the first memory element and a first output port of the pixel circuit;
a second output switch circuit coupled to the second memory element and a second output port of the pixel circuit; and
a third output switch circuit coupled to the readout circuit, the first memory element, the second memory element and a common reference terminal of the pixel circuit.

7. The imaging integrated circuit of claim 6, wherein the first input terminal of the fourth amplifier is connected to the first output port of a target pixel circuit, the first input terminal of the third amplifier is connected to the second output port of the target pixel circuit, and the second input terminal of the third amplifier and the second input terminal of the fourth amplifier are connected to the common reference terminal of the target pixel circuit.

8. The imaging integrated circuit of claim 4, wherein each of the second and third integrators further comprises a capacitor, a first switch, a second switch, and a third switch, wherein the capacitor is connected in series with the second switch, the first switch is connected in parallel with the capacitor and the second switch, and the third switch is connected to the capacitor, the second switch and the reference voltage terminal, and wherein the first switch and the capacitor are connected to the first input terminal of a corresponding amplifier and the first and second switches are connected to the output terminal of the corresponding amplifier.

9. A method for image information acquisition, the method comprising:
obtaining image information from a pixel circuit array having a plurality of pixel circuits, wherein the image information from a pixel circuit of the plurality of pixel circuits comprises a reference signal produced by background noise of the pixel circuit and a signal produced by optical exposure of a photodetector of the pixel circuit and the background noise of the pixel circuit; and
reading out the image information obtained by the pixel circuit array using a charge acquisition circuit, wherein the charge acquisition circuit comprises a first amplifier, a differential integrator connected in series with the first amplifier, wherein the differential integrator comprises a second amplifier, a first differential integrator section and a second differential integrator section, wherein the first amplifier is used as a common mode regulator for the second amplifier, wherein each of the first and second integrator sections includes a capacitor, a first switch, a second switch, and a third switch, wherein the capacitor is connected in series with the second switch, the first switch is connected in parallel with the capacitor and the second switch, and the third switch is connected to the capacitor, the second switch and a common mode reference voltage terminal, and wherein the first switch and the third switch are controlled by a first control signal and the second switch is controlled by a second control signal.

10. The method of claim 9, wherein the photodetector of the pixel circuit is a photodiode, and wherein the image information from the pixel circuit comprises the reference signal produced by background noise of the pixel circuit and a signal produced by optical exposure of the photodiode of the pixel circuit and the background noise of the pixel circuit.

11. The method of claim 9, wherein the charge acquisition circuit further comprises:
a second integrator that includes a third amplifier;
a third integrator that includes a fourth amplifier;
first and second storage capacitors coupled to the second integrator and the differential integrator; and
third and fourth storage capacitors coupled to the third integrator and the differential integrator.

12. The method of claim 11, wherein each of the third and fourth amplifiers comprises:
a first input terminal connected to the pixel circuit array;
a second input terminal connected to a reference voltage terminal; and
an output terminal coupled to the first and second storage capacitors or the third and fourth storage capacitors.

* * * * *